Patented Aug. 16, 1938

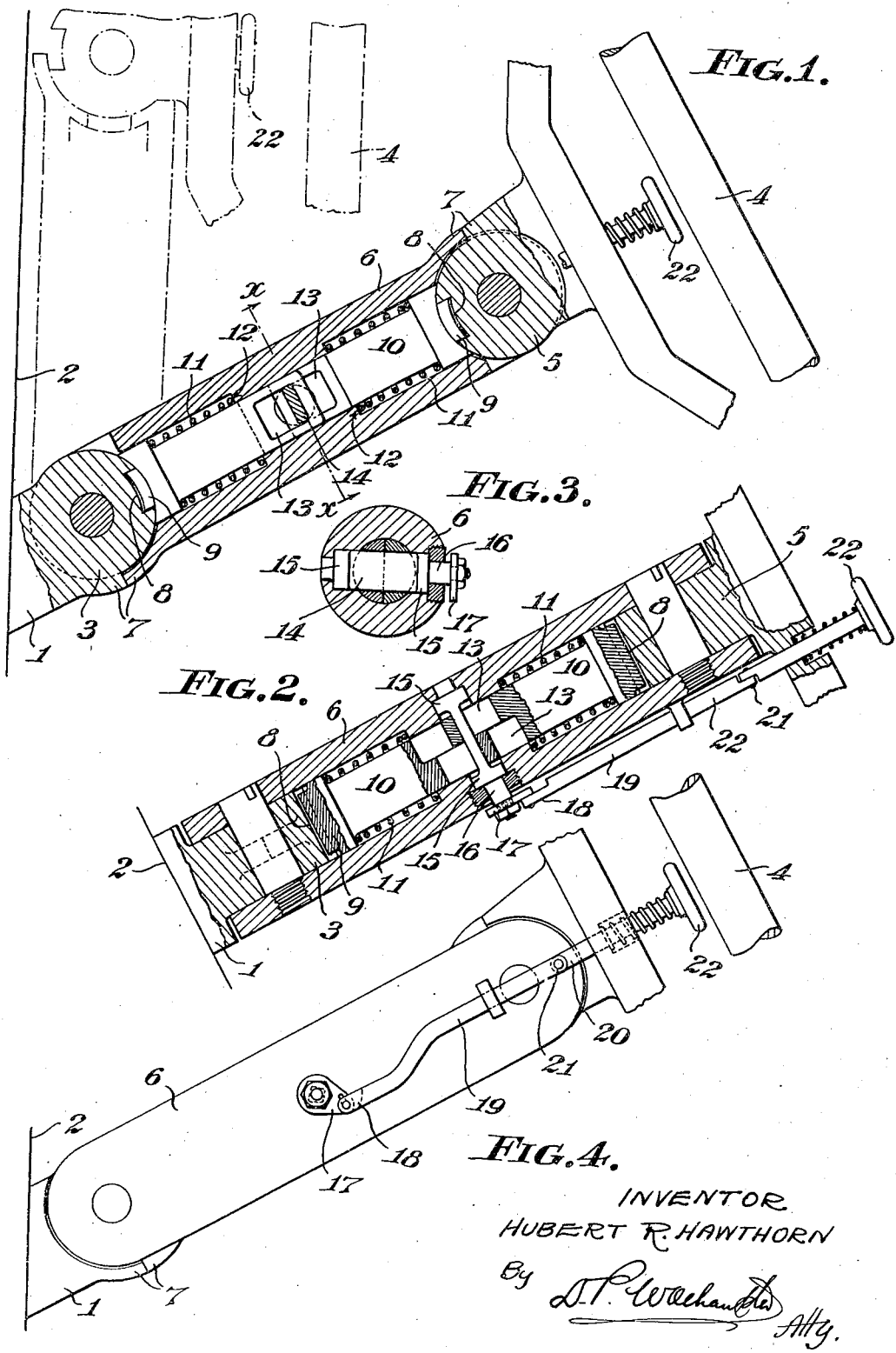

2,127,171

UNITED STATES PATENT OFFICE 2,127,171

STEERING WHEEL OF ROAD VEHICLES

Hubert Richard Hawthorn, Mitcham, Surrey, England

Application November 1, 1937, Serial No. 172,251
In Great Britain November 2, 1936

6 Claims. (Cl. 74—493)

This invention relates to the steering wheels of road vehicles and the objects of the invention are (1) to provide a steering column which can be instantly collapsed for convenience or in a case of emergency such as in a collision in which injury would otherwise be caused to the driver on being violently thrown against the steering wheel of the car, or by said steering wheel being forced against the said driver, (2) to prevent drivers being pinned in their seats or cabins, as the case may be, with risk of life from fire, (3) to facilitate repairs and adjustments in places where normally a steering wheel and column obstruct free movement, (4) to enable meals, picnics and the like being taken, in the car, when the column is collapsed out of the way against the dashboard, (5) as a thief-proof device collapsed against the dashboard and locked thereto, to render the car undrivable and (6) to enable the driving-seat to be entered as easily as the passenger seat.

In order that the invention may be the more readily understood, reference is to be had to the following description and accompanying sheet of drawings illustrative of the invention, and wherein:—

Figure 1 is a vertical sectional view of the device shown in its normal steering position.

Figure 2 is a sectional plan view thereof.

Figure 3 is a sectional view taken on line x—x of said Figure 1.

Figure 4 is a side elevational view of the device.

Like numerals of reference indicate corresponding parts in the several figures.

In carrying out the invention, and referring to the drawing, the steering shaft 1 is shortened so that it extends slightly inwardly of the dashboard 2, or a vertical line from the same, and is formed or provided with the male member 3 of a rule or knuckle joint, whilst the steering wheel 4 is fixedly carried by a member which is also formed or provided with the male member 5 of another rule or knuckle joint.

A hollow link 6, of suitable length, is provided at its ends with the co-acting female members of the said rule or knuckle joints each for the pivotal reception therein of a male member of the joint. The said rule or knuckle joints are each provided with a stop device 7, the one for preventing the link 6 from moving downwardly out of alignment with the steering shaft 1, the other for preventing the steering wheel 4 from being moved upwardly in relation to the link 6 aforesaid.

In the centre of the free end of each male member of a joint, there is provided a recess 8 which is adapted to engage the centrally disposed lug 9 which extends from the head of a plunger 10 which is slidably mounted in the bore of the link 6 and is encircled by a coiled compression spring 11 which bears against the inner face of the head of the plunger 10 and a shoulder 12 of the bore of the link 6, so that the lug 9 aforesaid is normally locked in the recess of the male member of the joint.

The plungers 10 aforesaid are, at their inner ends, each halved, longitudinally, a convenient length, so that they are slidable one with another, but with their ends spaced from one another, see Figure 2, and in each half end there is provided a rectangular slot 13, the said slots 13 registering with one another.

A cam or bar 14 extends through the slots 13 aforesaid and at right angles to the longitudinal axis of the link 6 so that said cam or bar 14 engages with the inward end of each slot 13, and said cam or bar 14 is provided at both ends with a circular head 15.

The heads 15 aforesaid are rotatably mounted in diametrically oppositely disposed holes in the wall of the link 6, and one head 15 is provided with an extension 16 which extends through and is rotatable in a member screwed into the wall of the link 6, said extension having secured thereto, at its end, an arm 17 which is pivotally connected to the off-set end of a spring-controlled push rod constituted by two parts 19 and 20 pivotally connected together at 21. This spring-controlled push rod 19, 20 is slidably guided and its pivot 21 is in the same plane as the axes of the knuckle joints and the cam or bar 14, said push rod 19, 20 being fitted with an operating knob 22.

On striking the knob 22 on the push rod 19, 20, the same is moved forwardly until its pivot 21 is in axial alignment with the pivot of the male member 5, the cam or bar 14 is caused to turn through 90° with consequent drawing together or inward movement of the plungers 10, against the action of their springs 11, so that the lugs 9 of the said plungers 10 are withdrawn from the recesses 8 of the male members 3 and 5 of the rule or knuckle joints, and then, on thrust being exerted on the steering wheel 4, the link 6 is upwardly swung until it is adjacent and parallel to the dashboard and/or the windscreen as shown in broken lines in Figure 1, whilst the steering wheel 4 is swung downwardly so that it is parallel with the link 6, part 20 of the push rod swinging on its pivot 21, the lugs 9 of the plungers 10 then resting on the plain surfaces of the male members 3 and 5 of the rule or knuckle joints.

On forwardly and downwardly pulling the steering wheel 4, the link swings down until it is in alignment with the steering shaft 1 and arrested by its stop 7, and, at the same time, the steering wheel 4 and part 20 of the push rod are swung upwardly until said wheel 4 is at right angles to the link 6 and is arrested by its stop 7, and the parts 19, 20 of the push rod are in alignment again, whereupon the plungers 10 are returned by their springs 11 so that the lugs 9 of said plungers 10 engage in their respective recesses 8 in the rule or knuckle joints so that a right line formation of steering shaft 1 and link 6 again obtains.

To prevent theft when the device is collapsed against the dashboard and to render the vehicle undrivable, there may be mounted on the dashboard a hasp similar to that of a padlock, adapted to embrace the shaft of the device and to engage and lock in a key-actuated lock on said dashboard. This is an obvious arrangement and therefore is not shown in the drawing.

Further, the rim of the steering wheel is provided with a distinguishing mark on its top dead centre to give an indication that all the wheels of the road vehicle are in alignment, and to enable the wheel to be correctly positioned i. e. with the mark in the upper half of wheel to allow said wheel and the column to be collapsed forwardly.

I claim:—

1. Steering control means for road vehicles comprising a steering shaft having an upper portion connected through a joint to the main portion of the shaft, a steering wheel connected to the said upper portion of the shaft through a joint spaced from the first joint, each of said joints permitting relative angular movement of the parts connected by it, spring-urged means carried by the movable upper portion of the steering shaft and adapted for positive locking engagement with an associated part of the main portion of the shaft and with an associated part of the steering wheel thereby to effect automatically and simultaneously the rigid locking together of all parts connected through the joints, and hand-operated means for releasing the said locking means of the two joints simultaneously.

2. Steering control means for road vehicles according to claim 1, wherein the said spring uged means comprises a pair of plungers urged apart by spring means and having projections adapted to engage into notches formed in the associated part of the steering wheel and in the main portion of the steering shaft respectively, and the hand operated releasing means is constituted by a partially rotatable non-circular member operating on the plungers to withdraw them simultaneously.

3. Steering control means for road vehicles according to claim 1 having joint-locking means comprising a pair of plungers outwardly urged by spring means, said plungers having projections at their outer ends to engage into notches in the main portion of the steering shaft and in an associated portion of the steering wheel respectively, and having extensions at their inner ends arranged to overlap one another, slots formed in said overlapping extensions, a partially rotatable releasing device passing through said slots for actuating said plungers simultaneously, and operating means for said releasing device comprising a crank fitted thereon externally of the shaft, and a jointed push rod extending to the region of the steering wheel and crank and having its joint positioned to coaxially align with a pivot axis of the joint provided on the steering wheel when the joints are unlocked, thereby to allow the wheel to be angularly displaced.

4. A steering column for road vehicles comprising a steering shaft having the male portion of a knuckle joint formed thereon and provided with a recess, a hollow link having the opposite ends thereof formed with lower and upper female portions of a knuckle joint, the lower of said female portions being pivoted to the male portion of the knuckle joint on the steering shaft, a steering wheel support having the male portion of a second knuckle joint formed thereon and pivoted to the female portion of the knuckle joint formed at the upper end of the link, said male portion of the second knuckle joint on the steering wheel support also having a recess, spring pressed locking bolts housed in the hollow link and each having lugs at their opposite ends to seat in said recesses of the male portions of said knuckle joints, the inner ends of said locking bolts being disposed in overlapping sliding relation and having registering openings, a cam operating in said openings to retract the bolts against spring pressure, and means for operating said cam.

5. A steering column for road vehicles comprising a steering shaft having the male portion of a knuckle joint formed thereon and provided with a recess, and also provided at its lower side with a stop abutment, a hollow link having the opposite ends thereof formed with lower and upper female portions of a knuckle joint, the lower of said female portions being pivoted to the male portion of the knuckle joint on the steering shaft, said female portions formed on the link each having stop abutments provided thereon at the top and bottom sides of the link, the stop abutment on the lower side of the link being adapted to engage with the stop abutment on the lower side of the steering shaft, a steering wheel support having the male portion of a second knuckle joint formed thereon and pivoted to the female portion formed at the upper end of the link, said male portion of the second knuckle joint also having a recess, and also having a stop abutment at its upper side to be engaged by the stop abutment formed on the top of the link, spring pressed locking bolts housed in the hollow link and each having lugs at their outer ends to seat in said recesses of the male portions of said knuckle joints, the inner ends of said locking bolts being disposed in sliding relation and having registering openings, a cam operating in said openings to retract the bolts against spring pressure, and means for operating said cam.

6. In a steering column for road vehicles the combination with a steering shaft and a steering wheel support, of a tubular link pivotally connecting said shaft and said steering wheel support, and means housed within said link for locking said steering shaft and the steering wheel support in axial alinement, said means comprising a pair of oppositely disposed spring pressed locking plungers adapted to be engaged and disengaged with keeper means respectively on the steering shaft and steering wheel support, and means for retracting said plungers against spring pressure to release them from locking engagement with the steering shaft and steering wheel support.

HUBERT RICHARD HAWTHORN.